Patented Apr. 1, 1941

2,236,672

UNITED STATES PATENT OFFICE 2,236,672

BROMINATED ARYLAMINOANTHRAQUINONE COMPOUNDS

Samuel Coffey and Frank Lodge, Blackley, Manchester, England, assignors to Imperial Chemical Industries Limited, a corporation of Great Britain No Drawing. Application April 27, 1938, Serial No. 204,680. In Great Britain May 4, 1937

2 Claims. (Cl. 260—373)

This invention relates to dyestuffs for wool or other animal fibres and more particularly to new derivatives of 1-amino- and 1-hydroxy- 4-arylaminoanthraquinonesulphonic acids and 1,4-diaryl aminoanthraquinonesulphonic acids, of their substituted derivatives, and of the color bases for these dyestuffs.

This invention has as an object to provide new derivatives of the above compounds. A still further object is to provide new derivatives of the above compounds which will be dyestuffs for animal fibres, or coloring matters for lacquers, stains, and varnishes, or valuable intermediates for the manufacture of such dyestuffs or such coloring matters. A still further object is to devise new methods of dyeing whereby new shades can be obtained by the utilisation of said new derivatives. A still further object is to devise new methods of manufacturing such new derivatives. Further objects will appear hereinafter. These objects are accomplished by the following invention.

We have found that both the above wool dyestuffs and the corresponding color bases, in which at least one position ortho or para to the —NH— group in at least one arylamino radical is unsubstituted, react readily with brominating agents, and that the brominated products, containing 1 to 3 atoms of bromine in at least one arylamino radical, are valuable wool dyestuffs, or else valuable coloring matters for lacquers, stains and varnishes, or valuable intermediates for the manufacture either of wool dyestuffs or of other products. While we speak of the dyestuffs obtained according to our invention as being wool dyestuffs, we mean also that they are dyestuffs for other animal fibres.

When the brominated compounds are not wool dyestuffs, they can be converted to such by sulphonation, so that a compound with a sufficiency of such groups is obtained, and the invention includes such conversion.

The bromination may be conveniently effected by using bromine as the brominating agent, and the bromine may be used in, for instance, an acid medium. We have found that concentrated sulphuric acid and glacial acetic acid are very convenient acid media. We have also found that organic liquids such as chloroform and nitrobenzene are very convenient. Bromination however is not restricted to the methods just mentioned. Generally speaking, it appears that bromine, if used in sufficient quantity, enters into every free ortho and para position in the aryl group.

Sulphonation may be conveniently effected by treatment with a sulphonating acid, such as sulphuric acid or oleum.

The invention may be more particularly illustrated by referring to the bromination of 1-amino-4-p-n-butyl - anilinoanthraquinone-2-sulphonic acid. When this is treated in concentrated sulphuric acid with excess of bromine a dibromo derivative is obtained, probably 1-amino-4-(2',6'-dibromo-4'-p-n - butyl) anilinoanthraquinone-2-sulphonic acid. This dyes wool in bluish-violet shades, while the parent dyestuff dyes in greenish-blue ones. In addition the dyeings of the brominated dyestuff show greater fastness to severe washing and milling than the dyeings of the unbrominated dyestuff.

As an illustration of the invention, when the bromination is applied to a color base, reference may be made to the bromination of 2-chloro-1-amino - 4 - anilino - anthraquinone. When this compound is treated in glacial acetic acid, with excess of bromine, a tribromo compound, namely, 2-chloro - 1 - amino-4(2',4',6'-tribromo) anilino - anthraquinone is obtained.

The following examples in which parts are by weight illustrate but do not limit the invention:

*Example 1.*—95 parts of 1-amino-4-p-n-butyl-anilinoanthraquinone - 2 - sulphonic acid (see British Patent No. 446,819) are dissolved in 950 parts of 98% sulphuric acid at 20–25° C. and 100 parts of bromine added with good stirring during 1 hour. After stirring for 16 hours, the brominated product is precipitated in 3000 parts of ice-water containing a little sodium sulphite, filtered and washed with cold water. The free sulphonic acid is then made alkaline with sodium hydroxide in 5000 parts of warm water, re-precipitated with sodium chloride, filtered, washed with 1% sodium chloride solution and dried.

The new dyestuff, which appears to be 1-amino-4(2',6'-dibromo - 4' - n - butyl) anilinoanthraquinone-2-sulphonic acid, is blue violet in color, soluble in hot water with bluish-violet color and dyes wool from a weakly acid bath in very bright bluish-violet to reddish-blue shades of good fastness to washing, milling, perspiration and light.

In a similar manner 1-amino-4-p-isoamyl-anilinoanthraquinone-2-sulphonic acid may be converted to 1-amino-4-(2',6'-dibromo-4'-isoamylanilino) anthraquinone - 2 - sulphonic acid, which is a dyestuff of similar shade and fastness properties to the one above.

*Example 2.*—70 parts of 2-chloro-1-amino-4-anilinoanthraquinone are suspended in 1000 parts of glacial acetic acid at 20–25° C. and 104 parts of bromine added during 30 minutes. The temperature is raised to 90° C. for 2 hours to complete bromination, then the product is isolated by adding 1000 parts of water, filtering and washing with water.

When dry, the violet product may be crystallised from hot nitrobenzene yielding violet crystals with a bronzy lustre. It appears to be 2-chloro-1-amino - 4-(2',4',6'-tribromo) anilinoanthraquinone.

In a similar way 2-bromo-1-amino-4-p-toluidinoanthraquinone and 1-methylamino-4-p-toluidinoanthraquinone may be brominated. The brominated products may be used for coloring nitrocellulose lacquers.

*Example 3.*—76 parts of 1-amino-4-sulpho-p-n-dodecylanilinoanthraquinone-2-sulphonic acid are dissolved with stirring in 500 parts of 98% sulphuric acid. 50 parts of bromine are added to the solution and the mixture is stirred at 20–30° C. for 18 hours. The excess of bromine is then removed in a current of air and the mixture poured into 2000 parts of ice-water containing a little dissolved sodium sulphite. The mixture is filtered, washed with a little cold water, and neutralized in 2000 parts of warm water with sodium hydroxide; the dyestuff is then precipitated with a little sodium chloride, cooled and filtered.

When dry, the new dyestuff, which appears to be 1-amino-4-sulpho-(2', 6'-dibromo-4'-n-dodecyl)anilinoanthraquinone-2-sulphonic acid, is a reddish-blue powder, soluble in concentrated sulphuric acid with greenish-blue color and in warm water to a bright, extremely reddish-blue solution. Wool is dyed from a neutral or weakly acid bath in bright reddish-blue shades of very good fastness to severe washing, milling and light.

*Example 4.*—85 parts of the greenish-blue dyestuffs obtained according to the process of British Patent No. 441,845, by reacting formaldehyde with 2 mols. of 1-amino-4-anilinoanthraquinone-2-sulphonic acid, are dissolved in 900 parts of 98% sulphuric acid. 100 parts of bromine are added and the mixture stirred for 20 hours at 20–30° C. The product is isolated as in Example 3.

The new dyestuff yields a bright bluish-violet solution in warm water and wool is dyed from a weakly acid bath in bright bluish-violet or reddish-blue shades of very good fastness to severe washing, milling and light.

*Example 5.*—90 parts of 1-amino-4-anilinoanthraquinone-2-sulphonic acid are dissolved in 900 parts of 98% sulphuric acid. 150 parts of bromine are added and the mixture stirred at 20–30° C. for 20 hours. The product is isolated in a similar manner to that of Example 3.

The new dyestuff, 1-amino-4-(2',4',6'-tribromo)-anilinoanthraquinone-2-sulphonic acid is obtained as a bronzy crystalline powder soluble in concentrated sulphuric acid with a reddish-blue color changing to green on addition of formaldehyde. Wool is dyed from a weakly acid bath in very bright bluish-violet shades of very good fastness to light and good fastness to washing and milling.

In a similar manner 1-amino-4-p-toluidinoanthraquinone-2-sulphonic acid and 1-amino-4-o-toluidinoanthraquinone-2-sulphonic acid may be converted to 1-amino-4-(2',6'-dibromo-4'-methylanilino)anthraquinone-2-sulphonic acid and 1-amino-4-(2',4',-dibromo-6'-methylanilino)anthraquinone-2-sulphonic acid respectively. These brominated dyestuffs yield bright extremely reddish-blue shades of very good fastness to light.

*Example 6.*—95 parts of 1-amino-4-p-acetaminoanilinoanthraquinone-2-sulphonic acid are dissolved in 900 parts of 98% sulphuric acid. 100 parts of bromine are added with good stirring and the temperature controlled at 20–30° C. for 20 hours. The brominated product is then isolated in a similar manner to that of Example 3.

The new product, a dark blue powder, is soluble in warm water to a bright blue solution and dyes wool from a weakly acid bath in bright reddish-blue shades, whereas the unbrominated dyestuff yields very greenish-blue shades.

In a similar manner brominated dyestuffs may be obtained from 1-amino-4-p-aminoanilinoanthraquinone-2-sulphonic acid, 1 amino-4-p-hydroxyanilinoanthraquinone-2-sulphonic acid, 1-amino-4-p-anisidinoanthraquinone -2- sulphonic acid, 1-amino-4-p-chloroanilinoanthraquinone-2-sulphonic acid, 1-amino-4-(2',4'-dimethylanilino)anthraquinone-2-sulphonic acid, 1-amino-4-(3'-carboxyanilino)anthraquinone-2-sulphonic acid and 1-amino-4-(2'-methyl-4'-butylanilino)-anthraquinone-2-sulphonic acid.

All these brominated dyestuffs dye in much redder shades of blue than the unbrominated ones, and they yield dyeings which are faster to washing than those from the unbrominated ones.

*Example 7.*—90 parts of 1-amino-4-anilinoanthraquinone-2-sulphonic acid are suspended in 900 parts of glacial acetic acid and 130 parts of bromine dissolved in 200 parts of glacial acetic acid are added at 20–25° C. with good stirring. The temperature is raised to 95° C. and kept there for 3 hours to complete bromination. The product is precipitated in cold water, filtered, neutralized with sodium hydroxide in 7500 parts of water at 90° C., coagulated by addition of sodium chloride and filtered warm. The paste is washed with a little cold water and dried.

The resulting dyestuff dyes wool in bright reddish-blue shades, which are not quite so red as those of the dyestuff of the first part of Example 5.

*Example 8.*—120 parts of 1-amino-4-sulpho-p-toluidinoanthraquinone-2-sulphonic acid are dissolved in 1000 parts of 98% sulphuric acid and 70 parts of bromine added at 20° C. with good stirring. After stirring at 15° C. for 16 hours the temperature is raised to 50° C. for 1 hour. The product is isolated by pouring into a mixture of 3500 parts of ice and water and 200 parts of sodium sulphite, filtering, neutralizing in 700 parts of water with sodium hydroxide, filtering hot to remove a little suspended matter and then precipitating with sodium chloride.

The resulting dyestuff dissolves in water with a bright reddish-blue color and in concentrated sulphuric acid with a blue color. It dyes wool in bright reddish-blue shades of very good fastness to light.

*Example 9.*—110 parts of 1-amino-4-anilinoanthraquinone-2:7-disulphonic acid are dissolved in 900 parts of 98% sulphuric acid and 15 parts of bromine added at 15–20° C. with good stirring. After stirring for 16 hours at 20–25° C. the temperature is raised to 50° C. for 1 hour. The acid solution is then poured on to a mixture of 3000 parts of ice and water and 200 parts of sodium sulphite, filtered, neutralized with sodium hydroxide in 7000 parts of water at 80° C. and the dyestuff precipitated by adding 1000 parts of sodium chloride. It is filtered cold, washed with 5% aqueous sodium chloride solution and dried.

The resulting dyestuff dissolves in water with a blue color. It dyes wool in bright reddish-blue shades, whereas the unbrominated dyestuff yields greenish-blue shades.

*Example 10.*—72 parts of 1-amino-4-anilinoanthraquinone-2-carboxylic acid are dissolved in 700 parts of 98% sulphuric acid and 130 parts of brodine added with good stirring. After brominating at 20–25° C. for 18 hours the product is isolated by pouring the acid solution with 2500 parts of ice-water containing 200 parts of sodium sulphite, filtering, washing with water until acid-free and then drying at 50° C.

The new product, which is substantially pure 1 - amino -4-(2',4',6'-tribromoanilino) anthraquinone-2-carboxylic acid, consists of a bright blue powder which forms a sparingly soluble sodium salt. The triethanolamine salt yields a bright blue solution from which wool is dyed in bright reddish-blue shades. The latter are considerably redder than those obtained with 1-amino-4-anilinoanthraquinone-2-carboxylic acid.

*Example 11.*—100 parts of the dyestuff obtained by treating 1-amino-4-p-toluidino-2-methylanthraquinone with oleum and boric acid (Schultz Farbstofftabellen, 7 edtn., No. 1204) are dissolved in 100 parts of 98% sulphuric acid and 100 parts of bromine added with stirring. The mixture is heated at 50° C. for 3 hours, then allowed to cool at 20° C. during 16 hours. The product is poured into 3000 parts of ice water containing 200 parts of sodium sulphite, filtered, washed with 15% aqueous sodium chloride solution, neutralised with sodium hydroxide in 5000 parts of water at 80° C., precipitated with 1000 parts of sodium chloride, filtered and dried.

The resulting dyestuff dissolves in water with a reddish-blue color. It dyes wool in bright fast reddish-blue shades.

*Example 12.*—66 parts of 1-p-toluidino-4-hydroxyanthraquinone are suspended in 600 parts of glacial acetic acid and 90 parts of bromine added. The thick suspension obtained is heated to 95° C. for 3 hours then cooled for 16 hours. The product is put into 3000 parts of water, filtered, washed with cold water and dried.

The dry product is in the form of violet-red crystals, which dissolve in benzene with a bluish-red color, whereas the starting material dissolves with a purple color.

*Example 13.*—50 parts of 1,4-bis-(p-n-butylanilino)anthraquinone and 300 parts of chloroform are stirred at 10° C. and 80 parts of bromine slowly added. The temperature is raised to 60° C. in 30 minutes and maintained for 1 hour. During this period hydrogen bromide is evolved and the mixture becomes brilliant violet in color. 500 parts of ethyl alcohol are added, the product filtered cold and the resulting violet crystals washed successively with ethyl alcohol and water. The new compound, 1,4-bis-(2',6'-dibromo-4'-n-butylanilino) anthraquinone is a violet substance melting at 206° C. It dissolves in chlorobenzene with a bright violet color and in concentrated sulphuric acid with a reddish-blue color. It is a blue-violet coloring matter for nitrocellulose lacquers. It is sulphonated by heating with 5 parts of 20% oleum at 80–90° C. until a test portion is completely water-soluble. The dyestuff is precipitated in ice-water, filtered, neutralised with sodium hydroxide in warm water and reprecipitated with sodium chloride. The reprecipitated product dissolves in hot water to a violet solution which froths on shaking, and which dyes wool from an acid bath in violet shades. The dyeings have very good fastness to severe washing and milling.

*Example 14.*—89.2 parts of 1,4-bis-(2',4'-dimethylanilino)-anthraquinone and 500 parts of chloroform are stirred at room temperature and 80 parts of bromine added. The temperature is raised to 60° C. during 30 minutes and maintained for 1 hour. During this time the mixture changes from a bluish-green to a bright blue color and hydrobromic acid is evolved. 2500 parts of ethyl alcohol are added and the product filtered cold and washed successively with ethyl alcohol and water. The new compound, 1:4-bis-(2'-bromo-4':6'-dimethylanilino)anthraquinone is a blue powder readily soluble in benzene with a bright reddish-blue color and melting at 252° C. It is sulphonated by dissolving in 5 parts of 20% oleum at 10° C. and stirring until a test portion is completely soluble in water. The sulphonated product dyes wool from a weakly acid bath in very bright reddish-blue shades. The dyeings have excellent fastness properties.

*Example 15.*—106 parts of 1,4-bis-(2'-methyl-4'-n-butylanilino)anthraquinone and 500 parts of chloroform are stirred together at 15° C. and 80 parts of bromine added. The mixture is boiled for 1 hour, when a deep reddish-blue liquor is obtained. 2500 parts of ethyl alcohol are added, the precipitated product filtered, washed with ethyl alcohol and dried.

The new compound, which is probably 1,4-bis-(6'-bromo-2'-methyl-4'-n-butylanilino)anthraquinone consists of a bronzy, crystalline powder which melts at 166° C. and dissolves readily in benzene and acetone with a reddish-blue color. It is a reddish-blue coloring matter for nitrocellulose lacquers.

The compound is sulphonated as follows: 50 parts are dissolved with stirring in 300 parts of 20% oleum at 20–25° C. After 15 minutes the solution is poured into 2000 parts of ice water, 200 parts of sodium chloride are added and the temperature raised to 65° C. to coagulate the dyestuff. The latter is filtered, washed with 10% aqueous sodium chloride solution and dried at 50–80° C.

The dyestuff is bright blue and dissolves in water with a blue color and in concentrated sulphuric acid with a reddish-blue color. It dyes wool in bright reddish-blue shades of very good fastness to severe washing, milling and light.

*Example 16.*—95 parts of 1,4-bis-(2',4',5'-trimethylanilino)anthraquinone (obtained by reacting leuco-1,4-dihydroxyanthraquinone with pseudo-cumidine) are substituted for the 1,4-bis-(2'-methyl-4'-n-butylanilino)anthraquinone of Example 15, and the bromination carried out as before. The product, which is probably 1,4-bis-(6'-bromo-2',4',5'-trimethylanilino)anthraquinone, is a reddish-blue crystalline substance, which dissolves in benzene and acetone with a bright reddish-blue color.

It is sulphonated by treating cold with 5 times its own weight of 20% oleum. The resulting dyestuff dissolves in water with a blue color and dyes wool in very bright reddish-blue shades of very good fastness to washing, milling and light.

*Example 17.*—92 parts of 1,4-bis-(2',4'-dimethylanilino)-5-hydroxyanthraquinone (obtained by condensing leuco 1:4:5-trihydroxyanthraquinone with m-4-xylidine) and 500 parts of chloroform are stirred cold and 80 parts of bromine added. The mixture is boiled for 1 hour when a bright blue liquid is obtained. Ethyl alcohol is added and the precipitate filtered, washed with ethyl alcohol and dried. The product may be purified by dissolving it in hot pyridine-butanol mixture, cooling to 80° C., filtering precipitating from the filtrate with ethyl alcohol, filtering and washing with ethyl alcohol.

The product may be sulphonated by treating it with 20% oleum. The resulting dyestuff dyes wool in bright blue shades, which are much greener than those obtained with the dyestuff of Example 15 but of similar very good fastness to severe washing, milling and light.

*Example 18.*—54 parts of 1,4-bis-(4'-phenylanilino)-anthraquinone (obtained according to Example 11 of British Specification No. 392,056)

and 60 parts of nitrobenzene are stirred cold and 105 parts of bromine added. The mixture is then heated to 95–100° C. for 3 hours and at 120° C. for 1 hour, cooled, allowed to stand for 16 hours, filtered, washed with ethyl alcohol and dried. The product, which is probably 1,4-bis-(2',6'-dibromophenylanilino) anthraquinone is a dark-blue crystal line substance, which dissolves in benzene with violet color.

It may be sulphonated by treating it with 5 parts of 20% oleum. The resulting dyestuff is a dark-blue substance which is rather sparingly soluble in water and dyes wool in reddish-blue shades of very good fastness to severe washing and milling.

*Example 19.*—52 parts of 1,4-bis-(α-naphthylamino) anthraquinone and 600 parts of nitrobenzene are stirred cold and 75 parts of bromine added. The mixture is heated at 100° C. for 1 hour, when the product is precipitated with ethyl alcohol, filtered, washed with ethyl alcohol and dried.

It may be sulphonated by treating it with 5 parts of 20% oleum. The resulting dyestuff is blue and dissolves in water with a reddish-blue color. It dyes wool in reddish-blue shades of very good fastness to severe washing and milling.

*Example 20.*—67 parts of 1,4-bis-(p-anisidino)anthraquinone and 600 parts of nitrobenzene are stirred at 20–25° C. and 120 parts of bromine slowly added. The mixture is heated at 100° C. for 20 hours during which period the reaction mixture attains a bluish-violet color. The nitrobenzene is removed in steam, the product filtered, washed with water and dried.

The dry product dissolves in nitrobenzene with a reddish-blue color. It can be converted to a water-soluble dyestuff by sulphonation with 20% oleum.

The starting materials of our invention are, as described above, wool dyestuffs or color bases for wool dyestuffs which are 1-amino- or 1-hydroxy-4-arylaminoanthraquinone or 1,4-diarylaminoanthraquinones or their sulphonic acids or substituted derivatives of either, and in which at least one arylamine radical is unsubstituted in at least one position ortho or para to the —NH— group. The substituted derivatives include derivatives in which the substituents are in the aryl group or in the anthraquinone nucleus or, if present, the amino group. The substituents may be simple ones, for example alkyl, cycloalkyl, hydroxy, alkoxy, alkylthiol, amino, carboxy or sulpho substituents or they may be more complex, e. g. acetylamino and sulphonamido. Other substituents may be present, provided the compound is a wool dyestuff or a color base for such. The compounds which may be used as starting materials also include wool dyestuffs or color bases therefor containing two amino- or hydroxy-4-arylaminoanthraquinone groupings.

This invention is a valuable advance in the art as it discloses a broad range of new dyestuffs, coloring matters and intermediates, those of the products which are wool dyestuffs differ from the corresponding dyestuffs, which do not contain the bromine, in being different in shade and in being faster to washing and milling. The alteration in shade is a hypsochromic one, and in many cases, especially when two or more bromine atoms have been introduced, the change in shade is surprisingly large; thus for instance the conversion of 1-amino-4-anilinoanthraquinone-2-sulphonic acid into 1-amino-4-(2',4',6'-tribromo) anilino-anthraquinone-2-sulphonic acid changes the shade from greenish-blue to bluish-violet.

The products obtained according to this invention are nearly all new. It has been known to manufacture 1-amino-4-(6'-bromo-2',4'-dimethyl)anilino-anthraquinone-2-sulphonic acid, but this is made by a process which comprises interacting 6-bromo-2,4-dimethyl-1-aminobenzene with an anthraquinone derivative. An advantage of the process of the present invention is that it does not need arylamines which carry bromo substituents as starting materials. Furthermore it can be applied immediately to known wool dyestuffs and color bases, and the brominated products are obtained in excellent yield and purity.

As many apparently widely different embodiments of this invention may be made without departing from the spirit and scope thereof, it is to be understood that we do not limit ourselves to the specific embodiments thereof except as defined in the appended claims.

We claim:

1. The products obtained by the bromination of the compounds of the following general formula

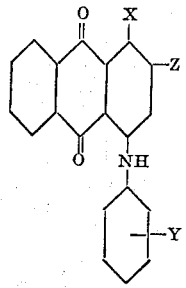

in which the bromine is present in the arylamino radical and in which X stands for a radical of the class consisting of —NH₂, —OH,

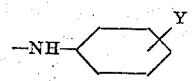

Y stands for an alkyl group containing at least 4 carbon atoms and Z stands for a substituent of the class consisting of —H and HSO₃—, and their sulfonation derivatives.

2. The products obtained by the bromination of the compounds of the following general formula

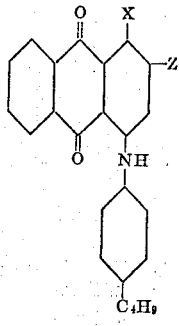

in which the bromine is present in the arylamino radical and in which X stands for a radical of the class consisting of —NH₂, —OH,

and Z stands for a substituent of the class consisting of —H and HSO₃—, and their sulfonation derivatives.

SAMUEL COFFEY.
FRANK LODGE.